Oct. 19, 1937.  H. SINCLAIR  2,096,070

HYDRAULIC COUPLING

Original Filed Oct. 1, 1932

INVENTOR
Harold Sinclair
BY
ATTORNEYS

Patented Oct. 19, 1937

2,096,070

UNITED STATES PATENT OFFICE 2,096,070

HYDRAULIC COUPLING

Harold Sinclair, London, England

Original application October 1, 1932, Serial No. 635,795, now Patent No. 2,074,346, dated March 23, 1937. Divided and this application April 9, 1935, Serial No. 15,502. In Great Britain October 6, 1931

25 Claims. (Cl. 60—54)

This application is a division of my application Serial No. 635,795, filed Oct. 1, 1932, now Patent No. 2,074,346, granted March 23, 1937.

The present invention relates to hydraulic couplings or gears of the kinetic type wherein an annular hydraulic circuit for the working liquid is comprised by a driving impeller element co-axial with a driven runner element, the said two elements each comprising a curved shell forming part of the boundary of the hydraulic circuit. It is especially but not exclusively applicable to the type of coupling adapted to operate with the hydraulic circuit only partly full of working liquid.

In order that such couplings and gears may be capable of transmitting power with a high efficiency, that is to say, with a low slip, it is necessary to minimize losses due to churning of the working liquid and to the formation of eddies therein during its vortex circulation between the driving and driven elements of the coupling. Consequently, in couplings adapted to operate at a high efficiency, the several elements forming the hydraulic circuit have been so shaped that the hydraulic circuit is bounded by smooth flowing lines, with the result that the stream of working liquid, in circulating between the driving and driven elements, is not subjected to abrupt deflection in its passage through the elements forming the hydraulic circuit.

High-efficiency couplings of the kind described above are often employed to connect driving and driven machines having a relatively high inertia, and with such an arrangement it is known that, if the relative speed of the driving and driven parts of the coupling is rapidly varied (by, for example, changing the ratio of a multi-ratio gearing connected in series with the hydraulic coupling), the torque transmitted by the coupling may momentarily rise to such a high value as to involve risk of damage to parts of the transmission system.

Furthermore, it has been found that, when such couplings are used with certain kinds of power transmission systems under certain conditions of operation, violent fluctuations may occur in the value of the torque transmitted by the coupling owing to inherent instability of the stream of liquid circulating between the driving and driven elements of the coupling. For example, in one known arrangement of power transmission system, the coupling, which is provided with means for varying the quantity of liquid in the hydraulic circuit while the coupling is operating, is connected between a driving machine running at a substantially constant speed and a driven machine requiring a high starting torque. With this arrangement, while the driving machine is rotating, the driven machine may be started from rest by admitting liquid to the hydraulic circuit, and the driven machine may be brought to rest by emptying or reducing the quantity of liquid in the hydraulic circuit. It is found however, that when the driven machine has in this way been accelerated or retarded, as the case may be, to a certain speed, the slip being high, torque surges may occur, so that it is not possible to maintain stable conditions of speed of the driven element. The surges may also cause the driving machine to be heavily overloaded, particularly if the inertia of the driven machine is high.

In another arrangement in which the coupling is employed to connect a source of power of variable speed to a load requiring a high starting torque, it has been found that torque surges may occur when the working chamber of the coupling is only partly filled, when the speed of the source of power is relatively low and when the slip in the coupling is high.

The torque surges above referred to are believed to be caused as follows: When such a coupling is operating with a partly filled hydraulic circuit and at a high slip, the circulation of the working liquid is irregular and indeterminate; as the slip decreases, however, the circulation assumes a definite form, for example, a shallow vortex ring of high velocity. This change in circulation occurs quickly and causes a more or less violent acceleration of the driven element, or conversely a more or less violent surge in power. The stream of liquid may then become attenuated, being subjected to an increased centrifugal force where it passes through the channels of the driven element, and the circulation finally collapses, with the result that the torque falls, and the slip increases again, so that the cycle may be repeated.

An object of the present invention is to provide an improved high efficiency coupling of the type described which is adapted automatically to prevent the transmission of undesirably high torque during acceleration or deceleration of the load.

A further object is to provide such a coupling in which the inherent instability above referred to is eliminated or reduced to an unimportant amount.

According to the present invention, in a hydraulic coupling or gear of the type hereinbefore set forth, wherein the boundary of the hydraulic working circuit follows smooth flowing lines, there are provided means adapted, consequent upon variation of the slip occurring in the coupling, automatically to introduce into said smooth boundary a discontinuity adapted to impede the liquid vortex circulation.

When my improved coupling is operating at a relatively high slip, and the velocity of circulation of the working liquid is correspondingly high, the discontinuity presented according to the present invention to the circulating liquid forms an obstruction of sufficient magnitude to prevent the attainment of an excessive velocity of circulation, and consequently the transmission of an undesirably high torque; and where the hydraulic circuit is only partly filled with liquid the discontinuity serves either to prevent the attainment of unstable flow conditions or to limit the magnitude of the instability to an unobjectionable value.

The invention will be described by way of example with reference to the accompanying drawing, which shows diagrammatically two forms of hydraulic coupling of the Vulcan (or so-called Föttinger) type and in which Fig. 1 is a sectional side elevation of part of one form of improved coupling.

Figure 1:
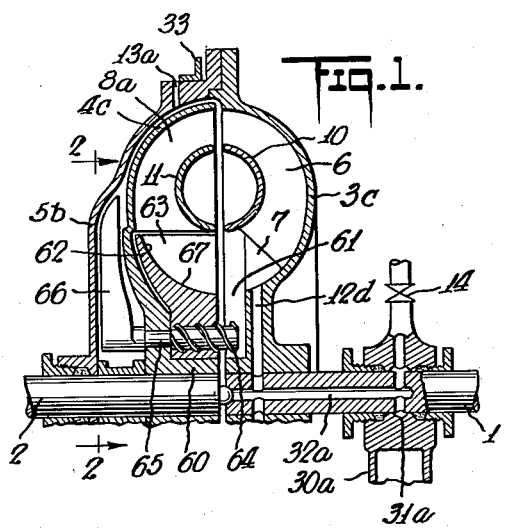
Figure 2:
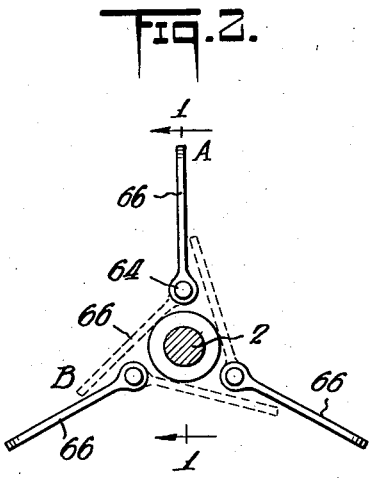
Fig. 2 is an end view of a detail of the arrangement shown in Fig. 1 taken on the line 2—2 in that figure.

Referring to Figs. 1 and 2, the impeller element 3c is attached to the driving shaft 1, while the runner element 4c is attached to the driven shaft 2. A casing member 5b which embraces the shell of the runner element 4c is secured to the periphery of the impeller 3c, forming therewith a working chamber for the coupling liquid. The impeller is provided with alternate long and short vanes 7 and 6 respectively, integral with the shell, and these vanes support a core guide member 10. The runner is provided with vanes 8a supporting a core guide member 11. Liquid inlet ports 12d are formed through the boss of the impeller, and discharge ports 13a, which may be controlled in known manner by a ring valve 33, serve to exhaust working liquid from the working chamber. A valve 14 in a pipe supplying working liquid under a suitable pressure controls the rate of inflow of liquid to the working chamber. A stationary liquid supply sleeve 30a surrounds the driving shaft 1, liquid being admitted through the inlet valve 14, the annular passage 31a, the axial passage 32a, and inlet ports 12d. The boss 60 of the runner 4c forms a cylindrical bearing for an axially movable portion 67 of the runner, this movable portion including a shell 62 and vanes 63 in line with vanes 8a of the runner 4c. The centre of the impeller 3c is cut back to form a space 61 providing clearance for axial movement of the member 67. A plurality, for example three, spindles 64 formed with long-pitch screws are threaded through tapped holes in the member 67 and journalled at 65 in the runner 4c in such a way as to be incapable of moving axially therein. Relatively heavy blades 66 are pinned to the spindles 64 and are accommodated in the space between the shell of the runner 4c and the casing 5b.

The operation of this coupling is as follows.

When the coupling is operating at low slip and consequently the runner 4c is rotating at a relatively high speed, centrifugal force due to the rotation of this element holds the blades 66 in the radial direction denoted by A in Fig. 2 and consequently the liquid passages through the runner have a smooth boundary. It has been proved experimentally that, when the liquid content of the working chamber is reduced and the slip is high, the action of centrifugal force, due to the higher velocity with which liquid now circulates between the impeller and the runner, urges liquid out of the hydraulic circuit into the space accommodating the blades 66, so that these blades remain at least partly submerged. Owing to the increased slip, liquid carried round by the casing 5b impinges on the blades 66 and rotates these blades and the spindles 64 towards the position denoted by B. The rotation of the spindles 64 serves to move the member 67 axially into the clearance space 61 formed on the impeller 3c, so that the shell 62 now projects into the passages through the runner and thereby introduces a discontinuity in the contour of this element. If the slip decreases, centrifugal force acting on the blades 66 overcomes the hydraulic force acting on them and the blades are consequently rotated to position A, so that the smooth boundary of the liquid passages in the runner is restored.

Figure 3:
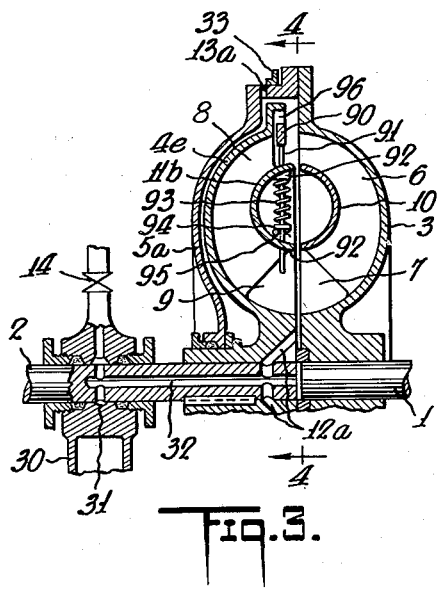
Fig. 3 is a sectional side elevation of a further form of coupling taken on the line 3—3 of Fig. 4
Figure 4:
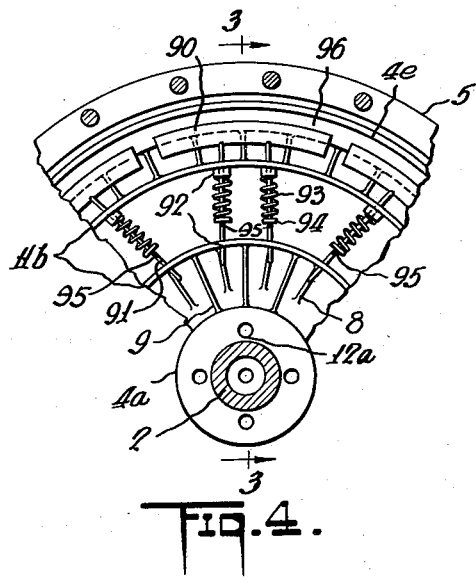
Fig. 4 is a sectional end elevation of a portion of this coupling taken on the line 4—4 in Fig. 3.

In the arrangement shown in Figs. 3 and 4 the runner 4e, which is covered by the casing 5a, is provided with alternate long and short vanes 9 and 8, and in this case the stationary liquid supply sleeve 30 embraces the driven shaft 2, the liquid inlet passages being denoted by 32 and 12a. The discontinuity is introduced by means of blades 90, each of which is supported on two rods 91 slidably carried in bearings 92 formed on the core guide member 11b, the arrangement being such that the blades can either project into the working circuit or be withdrawn clear thereof into a recess 96 formed on the radially outer part of the runner 4e. The rods 91 are urged towards the axis of the rotation of the coupling by springs 93 compressed between the outer portion of the core guide 11b and collars 94 retained by cotter pins 95 on the rods 91.

In this arrangement, when the slip is high and the speed of the runner is consequently low, the force exerted by the springs 93 overcomes centrifugal force due to the rotation of the runner and the blades 90 are thereby caused to project partly over the inlet ends of the liquid passages through the runner. As the slip in the coupling decreases, for example owing to increase of liquid content in the working chamber, centrifugal force overcomes the force due to the springs, and the blades 90 are thus withdrawn into the clearance space 96 and out of the path of liquid flowing between the impeller and runner elements.

The invention may obviously be applied also to hydraulic gears, that is to say, hydro-kinetic transmission devices wherein the hydraulic circuit includes a fixed reaction member and which therefore effect a change of torque as between the driving and driven shafts.

I claim:

1. A hydraulic coupling, or gear, of the kinetic type, comprising an annular hydraulic working circuit, means operable for impeding the liquid vortex circulation in said working circuit, and means adapted to function in response to variation in slip in said coupling or gear for automatically operating said means for impeding the vortex circulation.

2. A hydraulic coupling of the kinetic type, comprising a rotatable impeller element, a rotatable runner element, an annular hydraulic working circuit including said elements, liquid transfer means for increasing and reducing the liquid content of said circuit while the coupling is operating, means operable for impeding the liquid vortex circulation in said working circuit, and means adapted automatically to operate said means for impeding the circulation in response to variation in the speed of rotation of said runner element.

3. A hydraulic coupling, or gear, of the kinetic type, comprising rotatable impeller and runner elements, an annular hydraulic working circuit including said elements, means operable for introducing a discontinuity into the boundary of said working circuit, and a member mounted for rotation with said runner element and adapted to be displaced with respect to said runner element through the agency of kinetic energy imparted to the working liquid by said impeller element, displacement of said member serving to operate said means for introducing discontinuity into said boundary.

4. A hydraulic coupling of the kinetic type comprising a rotatable impeller element, a rotatable runner element coaxial with said impeller element, said elements having each an annular dished shell and being juxtaposed to form a toroidal working circuit, a movable baffle capable of forming a discontinuity in the boundary of said circuit, and means mounted on said runner element for rotation therewith, operatively connected with said baffle and operating automatically in response to increase in centrifugal force due to increase in speed of said runner element, for decreasing the magnitude of said discontinuity.

5. A hydraulic coupling, or gear, of the kinetic type comprising an annular hydraulic working circuit including rotatable co-axial impeller and runner members, means displaceable in an axial direction for introducing a discontinuity into said working circuit, and means adapted to function in response to variation in slip that occurs in said coupling or gear for automatically displacing said means for introducing discontinuity into said working circuit.

6. A hydraulic coupling of the kinetic type, comprising rotatable impeller and runner elements, an annular hydraulic working circuit including said elements, and means, operable automatically in response to variation in the slip that occurs in the coupling, for impeding the circulation in said working circuit.

7. A hydraulic coupling of the kinetic type comprising a rotatable impeller element, a rotatable runner element co-axial with and juxtaposed to said impeller element to form therewith an annular hydraulic working circuit, and an annular member which is movable in a direction parallel to the axis of said elements and which is operable automatically in response to variation in the relative speed of said elements, for impeding the circulation in said circuit when said relative speed is high.

8. A hydraulic coupling of the kinetic type comprising rotatable impeller and runner elements, an annular hydraulic working circuit including said elements, and a baffle element displaceable axially of said elements so as to obstruct said circuit to a variable extent, said baffle element being mounted for rotation with one of said elements and operable through the agency of energy imparted to the working liquid by said impeller element.

9. A hydraulic coupling of the kinetic type comprising a rotatable impeller element and a rotatable runner element, each of said elements having an annular dished shell and said shells being juxtaposed to form an annular hydraulic working circuit, and a baffle element movable automatically in response to variation in the slip in said coupling, said baffle element being so shaped that in one position it forms substantially a continuation of the surface of one of said shells, and in another position it projects into said circuit.

10. A hydraulic coupling of the kinetic type comprising a rotatable impeller element, a rotatable runner element coaxial with said impeller element, said elements having each an annular dished shell, and being juxtaposed to form a toroidal working circuit, a baffle movable into and out of said circuit so as to impede to a variable extent the circulation of liquid in said circuit, and spring means arranged to urge said baffle continuously into its operative position in said circuit, said baffle being so mounted on said runner element that it is urged into its inoperative position by centrifugal force due to rotation of said runner element.

11. A hydraulic coupling of the kinetic type comprising rotatable driving and driven elements together forming an annular hydraulic working circuit, means for increasing and reducing the liquid content of said circuit while said driving element is rotating, and a baffle element operatively connected with a control spring and capable of moving automatically into and out of said circuit in response to variation in speed of said driven element.

12. A hydraulic coupling of the kinetic type comprising rotatable driving and driven elements together forming an annular hydraulic working circuit, means for increasing and reducing the liquid content of said circuit while said driving element is rotating, and a spring-loaded baffle element mounted on said driven element and capable of being displaced into said circuit in response to increase in speed of said driven element.

13. A hydraulic coupling of the kinetic type comprising a rotatable vaned element, a second rotatable vaned element juxtaposed to said first vaned element and forming therewith an annular hydraulic working circuit, a casing member fixed to said first vaned element and covering the back of said second vaned element so as to form a chamber between said casing and said second vaned element, a baffle member movable into and out of said circuit, and means mounted on the back of said second vaned element, so shaped as to engage liquid adjacent to said shell, and capable of automatically moving said baffle into said circuit as a result of an increase in the relative speed of rotation of said shell and said second vaned element.

14. A hydraulic coupling of the kinetic type comprising a rotatable vaned element, a second rotatable vaned element forming with said first vaned element an annular working circuit, an annular element fixed to said first vaned element and so shaped as to be capable of containing working liquid while the coupling is operating, a blade capable of being engaged by the liquid contained by said annular element, said blade being displaceably mounted on said second vaned element, and a baffle displaceable into and out of said circuit, said blade being operatively connected with said baffle and serving automatically to displace said baffle, in response to variation in relative speed of said vaned elements.

15. A hydraulic coupling of the kinetic type, comprising a vaned impeller element, a vaned runner element forming with said impeller element an annular working circuit, a casing fixed to the periphery of said impeller element and covering the back of said runner element so as to form a chamber between said casing and said runner element, said chamber being in communication with said circuit so that it is capable of receiving working liquid while the coupling is operating, a baffle member movable into and out of said circuit, a blade pivotally mounted on said runner element and so arranged as to engage liquid in said chamber, and an operative connection between said blade and said baffle member whereby pivotal movement of said blade serves to actuate said baffle member.

16. A hydraulic coupling of the kinetic type comprising a rotatable vaned element, a second rotatable vaned element forming with said first vaned element an annular working circuit, an annular element fixed to said first vaned element and so shaped as to be capable of containing liquid while the coupling is operating, a blade capable of being engaged by liquid contained by said annular element, said blade being pivotally mounted on said second vaned element so as to be capable of displacement about an axis disposed longitudinally of the coupling, a baffle movable parallel to said axis into and out of said circuit through the agency of co-operating screw-threaded parts, said blade being operatively connected with one of said parts.

17. A hydraulic coupling of the kinetic type having a vaned impeller element, a vaned runner element, a hydraulic circuit including said elements, a baffle mounted on said runner element and movable into and out of said circuit in a direction having a radial component about the axis of rotation of said elements, and means serving to urge said baffle towards said axis.

18. A hydraulic coupling of the kinetic type, comprising a rotatable impeller element, a rotatable runner element, said elements forming together an annular hydraulic working circuit, a baffle member movable into said circuit for impeding the liquid vortex circulation therein, and means serving automatically to move said baffle member into said circuit in consequence of a reduction in speed of rotation of said runner element while the speed of said impeller element remains constant.

19. A hydraulic coupling of the kinetic type, comprising a rotatable impeller element, a rotatable runner element, said elements forming together an annular hydraulic working circuit, a baffle member movable into said circuit for impeding the liquid vortex circulation therein, and means serving automatically to move said baffle member into said circuit in consequence of an increase in slit between said elements involving a reduction in speed of rotation of said runner element.

20. A hydraulic coupling of the kinetic type, comprising an annular hydraulic working circuit having a boundary in the form of smooth flowing lines, means for varying the liquid content of said working circuit while the coupling is operating, and means for introducing into said smooth boundary a discontinuity adapted to impede the liquid vortex circulation in said working circuit.

21. A hydraulic coupling of the kinetic type, comprising rotatable impeller and runner elements, an annular hydraulic working circuit including said elements, means operable for increasing and reducing the liquid content of said circuit while the coupling is operating, and means, operable automatically in response to variation in centrifugal force due to change of speed of said runner element, for obstructing to a variable but comparatively small extent the free circulation of the liquid in said working circuit.

22. A hydraulic coupling of the kinetic type comprising a rotatable impeller element, a rotatable runner element coaxial with said impeller element, said elements having each an annularly dished shell and being juxtaposed to form a toroidal working circuit, a baffle movable into and out of said circuit, and actuating means mounted for rotation with said runner element, and movable at least in part radially with respect to the axis of said elements, said actuating means being operatively connected with said baffle in such manner that when said actuating means move away from said axis, said baffle is constrained to move towards its inoperative position out of said circuit.

23. A hydraulic coupling of the kinetic type comprising a rotatable impeller element, a rotatable runner element coaxial with said impeller element, said elements having each an annularly dished shell, and being juxtaposed to form a toroidal working circuit, and automatic control means mounted for rotation with said runner element, said means including a baffle movable into and out of said circuit, and a member which is displaceable in a direction having a component radial with respect to the axis of said elements and which is operatively connected to said baffle, an outward movement of said member under the influence of increasing centrifugal force constraining said baffle to move into its inoperative position out of said circuit.

24. A hydraulic coupling of the kinetic type comprising a rotatable impeller element, a rotatable runner element coaxial with said impeller element, said elements having each an annular dished shell, and being juxtaposed to form a toroidal working circuit, and automatic control means which are mounted for rotation with said runner element and which include an actuating element movable towards and away from the axis of said runner element, means urging said actuating element towards said axis, a baffle movable into said circuit, and an operative connection between said actuating means and said baffle, constraining said baffle to move out of said circuit when said actuating means are forced away from said axis by centrifugal force.

25. A hydraulic coupling of the kinetic type comprising an annular hydraulic working circuit having a boundary following smooth flowing lines, means for varying the liquid content of said working circuit while the coupling is operating, and means responsive to variation in liquid content of said coupling for employing the energy of motion of liquid within the coupling to introduce into said smooth boundary a discontinuity adapted to impede the liquid vortex circulation in said working circuit.

HAROLD SINCLAIR.